(12) United States Patent
Fletcher et al.

(10) Patent No.: US 8,602,475 B2
(45) Date of Patent: Dec. 10, 2013

(54) SEAT MOUNTED EXTENDABLE LITTER SYSTEM

(75) Inventors: William K. Fletcher, Richmond, MI (US); Jay W. Winborn, Berkley, MI (US)

(73) Assignee: Milton Manufacturing Inc., Detroit, MI (US)

(*) Notice: Subject to any disclaimer, the term of this patent is extended or adjusted under 35 U.S.C. 154(b) by 47 days.

(21) Appl. No.: 13/372,606

(22) Filed: Feb. 14, 2012

(65) Prior Publication Data

US 2012/0205934 A1 Aug. 16, 2012

Related U.S. Application Data

(60) Provisional application No. 61/443,049, filed on Feb. 15, 2011.

(51) Int. Cl.
*A61G 3/00* (2006.01)

(52) U.S. Cl.
USPC ............................................................ 296/19

(58) Field of Classification Search
USPC ............. 296/19, 24.38; 5/118, 600, 620, 625, 5/626, 81.1 HS; 244/118.6, 13.2
See application file for complete search history.

(56) References Cited

U.S. PATENT DOCUMENTS

| | | | |
|---|---|---|---|
| 2,304,199 A | 12/1942 | Pinnow | |
| 2,337,505 A * | 12/1943 | Swift | 296/19 |
| 2,520,128 A * | 8/1950 | Cushman | 296/19 |
| 2,655,197 A | 10/1953 | Schofield | |
| 2,859,798 A | 11/1958 | Carte | |
| 3,358,300 A * | 12/1967 | Smith | 5/9.1 |
| 3,406,998 A * | 10/1968 | Rutzen et al. | 280/727 |
| 4,005,898 A * | 2/1977 | Way | 296/174 |
| 4,378,128 A | 3/1983 | Holling et al. | |
| 4,397,432 A | 8/1983 | Resetar | |
| 4,483,499 A * | 11/1984 | Fronk | 244/118.1 |
| 5,012,880 A | 5/1991 | Abner | |
| 5,107,857 A | 4/1992 | Linnemann et al. | |
| 5,372,339 A | 12/1994 | Morgan | |
| 5,383,629 A | 1/1995 | Morgan | |
| 5,490,703 A | 2/1996 | Hewko | |
| 6,152,401 A | 11/2000 | Green | |
| 6,460,929 B2 | 10/2002 | Kamida | |
| 6,923,606 B2 | 8/2005 | Fehrle et al. | |
| 7,028,351 B1 | 4/2006 | Frieder et al. | |
| 7,188,880 B1 | 3/2007 | Frieder et al. | |
| 7,325,815 B2 | 2/2008 | Rush | |
| 7,328,926 B1 | 2/2008 | Myers et al. | |
| 8,366,165 B2 * | 2/2013 | Maximilien et al. | 296/24.33 |

* cited by examiner

*Primary Examiner* — H Gutman
(74) *Attorney, Agent, or Firm* — Harness, Dickey & Pierce, P.L.C.

(57) ABSTRACT

A seat mounted extendable litter system includes a structural frame assembly supporting at least one seat. The seat has a seat member and a seat back member rotatable with respect to the seat member defining a seat upright condition and a seat folded condition. A litter tray is slidably connected to the structural frame assembly and oriented substantially horizontal in the seat folded condition such that the litter tray is slidable between a litter tray extended condition and a litter tray stowed condition.

22 Claims, 17 Drawing Sheets

US 8,602,475 B2

SEAT MOUNTED EXTENDABLE LITTER SYSTEM

CROSS-REFERENCE TO RELATED APPLICATIONS

This application claims the benefit of U.S. Provisional Application No. 61/443,049, filed on Feb. 15, 2011. The entire disclosure of the above application is incorporated herein by reference.

FIELD

The present disclosure relates to systems used to manipulate and transport litters carrying injured patients including military personnel.

BACKGROUND

This section provides background information related to the present disclosure which is not necessarily prior art.

Patient litter systems that are modularized to perform multiple functions such as providing for folding or rotating a litter from a stowed to a deployed condition are known. These systems generally provide for either a patient sitting position, or a patient prone position. It is also known to provide medical equipment in the immediate area of a litter or seat that is accessible from different orientations of the litter or seat. It is further known to provide electrical or hydraulic equipment to assist in raising or lowering a patient on a litter for loading or unloading of an emergency vehicle.

Known systems that permit movement of a litter generally provide wheels or similar devices that permit longitudinal sliding motion of the litter for independent litter motion. Other known systems that permit movement such as rotation of the litter provide complex hydraulic or electrical equipment to permit the litter to reach a loading position for a patient being moved on a litter. These systems are slow to operate and expensive to construct and maintain.

SUMMARY

This section provides a general summary of the disclosure, and is not a comprehensive disclosure of its full scope or all of its features.

According to several embodiments of the present disclosure, a seat mounted extendable litter system includes a structural frame assembly supporting at least one seat. The seat has a seat member and a seat back member rotatable with respect to the seat member defining a seat upright condition and a seat folded condition. A litter tray is slidably connected to the structural frame assembly and oriented substantially horizontal in the seat folded condition such that the litter tray is slidable between a litter tray extended condition and a litter tray stowed condition.

According to other embodiments, the litter tray includes at least one retention member releasably retaining a litter on the litter tray when in the seat folded condition such that the litter and the litter tray are together slidable between the litter tray extended condition and the litter tray stowed condition.

According to further embodiments, first and second litter tray frames are connected to the structural frame. A slide track assembly is connected to each of the first and second litter tray frames.

According to still further embodiments, a tray frame is connected to and is supports the litter tray. A tray retention release mechanism connected to the structural frame member has a latch hook releasably engaged with the tray frame to maintain the litter tray in the litter tray stowed condition.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
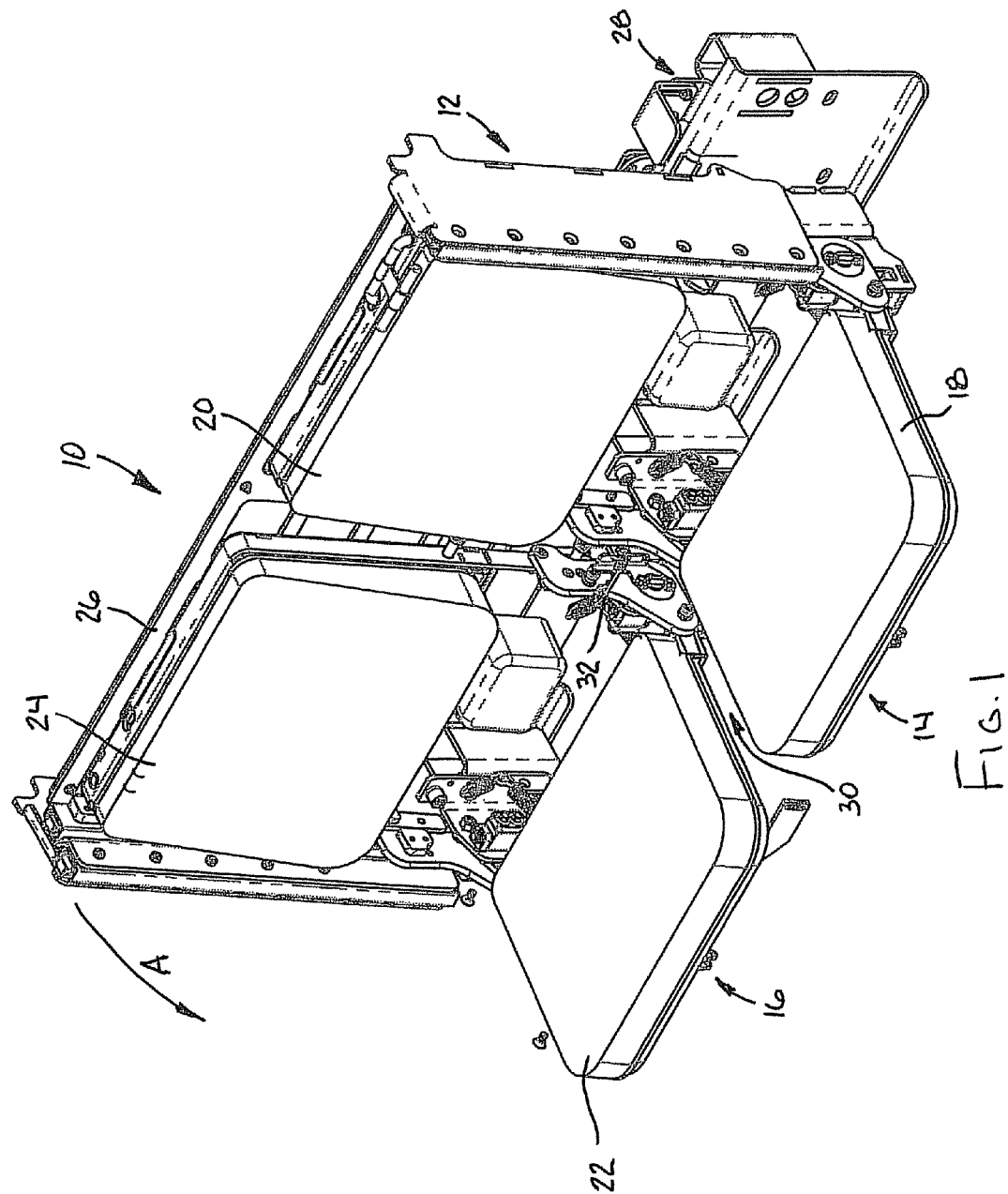
FIG. 1 is a front left perspective view of a seat mounted extendable litter system of the present disclosure in a seat upright condition.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a seat mounted extendable litter system 10 includes a structural frame assembly 12 to which are connected at least one and according to several embodiments first and second seats 14, 16 which can individually support an occupant of a vehicle such as an ambulance, truck, van, aircraft, or the like used to transport injured persons. First seat 14 includes a first seat member 18 and a first seat back member 20. Similarly, second seat 16 includes a second seat member 22 and a second seat back member 24. Each of the first and second seat back members 20, 24 are fixed to a seat back common support member 26 which, according to several embodiments, is made of a metal plate material, a polymeric material, or a composite material.

Seat mounted extendable litter system 10 further includes a vehicle connection structure 28 to which structural frame assembly 12 is connected. According to several embodiments, a seat release mechanism 30 is provided which includes a seat release bar 32 actuated to release structural frame assembly 12 from the upright condition shown for rotation with respect to a fold-down direction of rotation "A". This permits structural frame assembly 12 and each of the first and second seat back members 20, 24 to be rotated to a folded or stowed condition against first and second seat members 18, 22 which will be shown and described in better detail in reference to FIG. 6.

Figure 2:
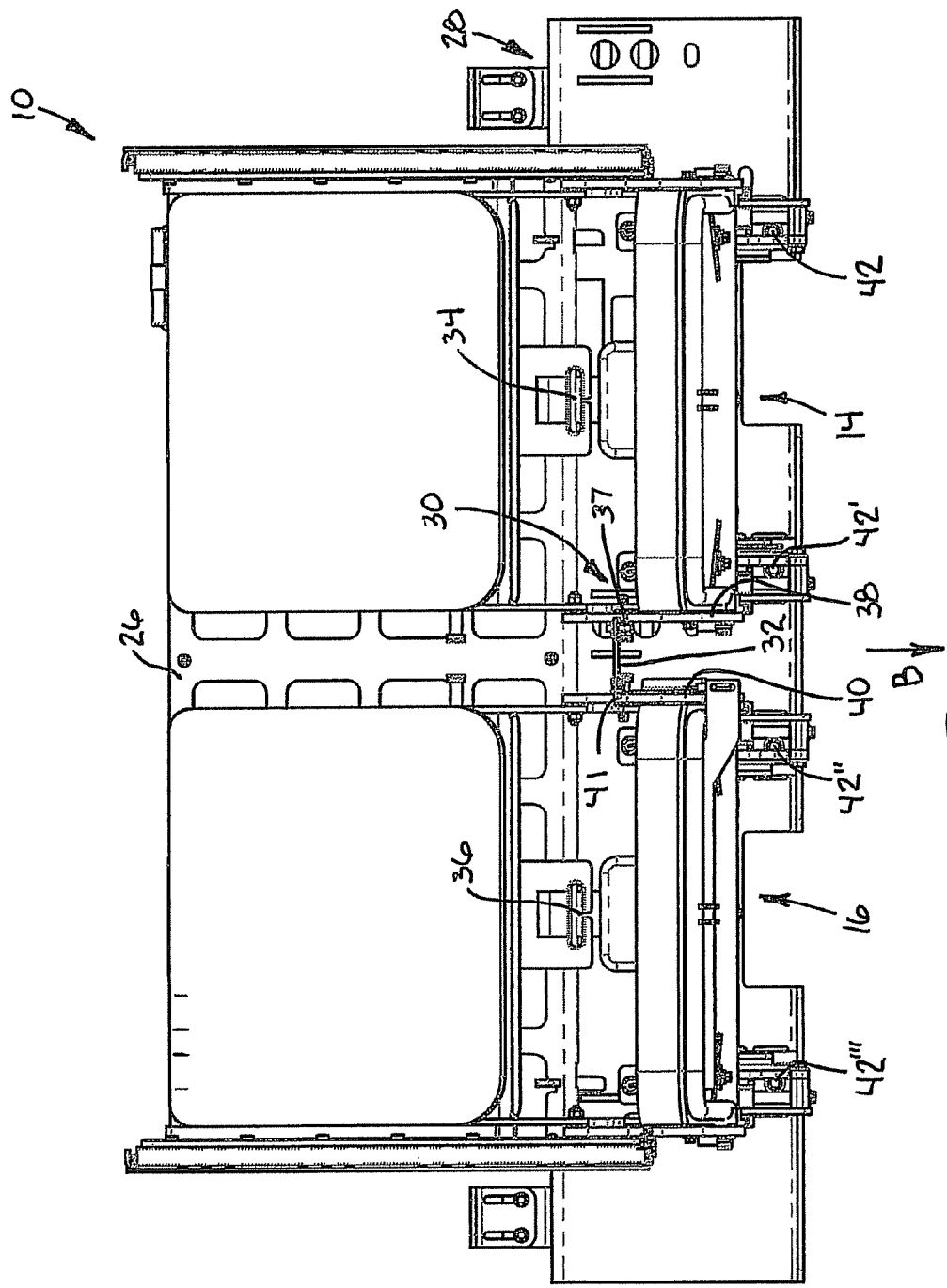
FIG. 2 is a front elevational view of the litter system of FIG. 1.

Referring to FIG. 2, seat release bar 32 includes opposed bar connection ends 37 and can be displaced in a mechanism release direction "B". Seat release bar 32 is positioned between first and second seat side frames 38, 40, each connected to one of first and second seats 14, 16. Seat release bar 32, when downwardly actuated/rotated, moves connection ends 37 to disengage seat back common support member 26 from a retention pin 41, permitting first and second seat back members 20, 24 to rotate downwardly (toward the viewer as seen in FIG. 2) away from the upright condition shown.

Seat mounted extendable litter system 10 can be connected to vehicle connection structure 28 using a plurality of energy absorbers 42, 42', 42", 42''' for example in military ambulance applications. The energy absorbers 42 are provided to absorb an energy induced into the vehicle and thereby to the vehicle connection structure 28, such as from an explosive device. Energy absorbers 42 act to limit the load imparted to occupants of either the first or second seats 14, 16. Seat mounted extendable litter system 10 also further includes first and second seatbelt systems 34, 36 which are provided to individually restrict occupants of one of the first and second seats 14, 16.

Figure 3:
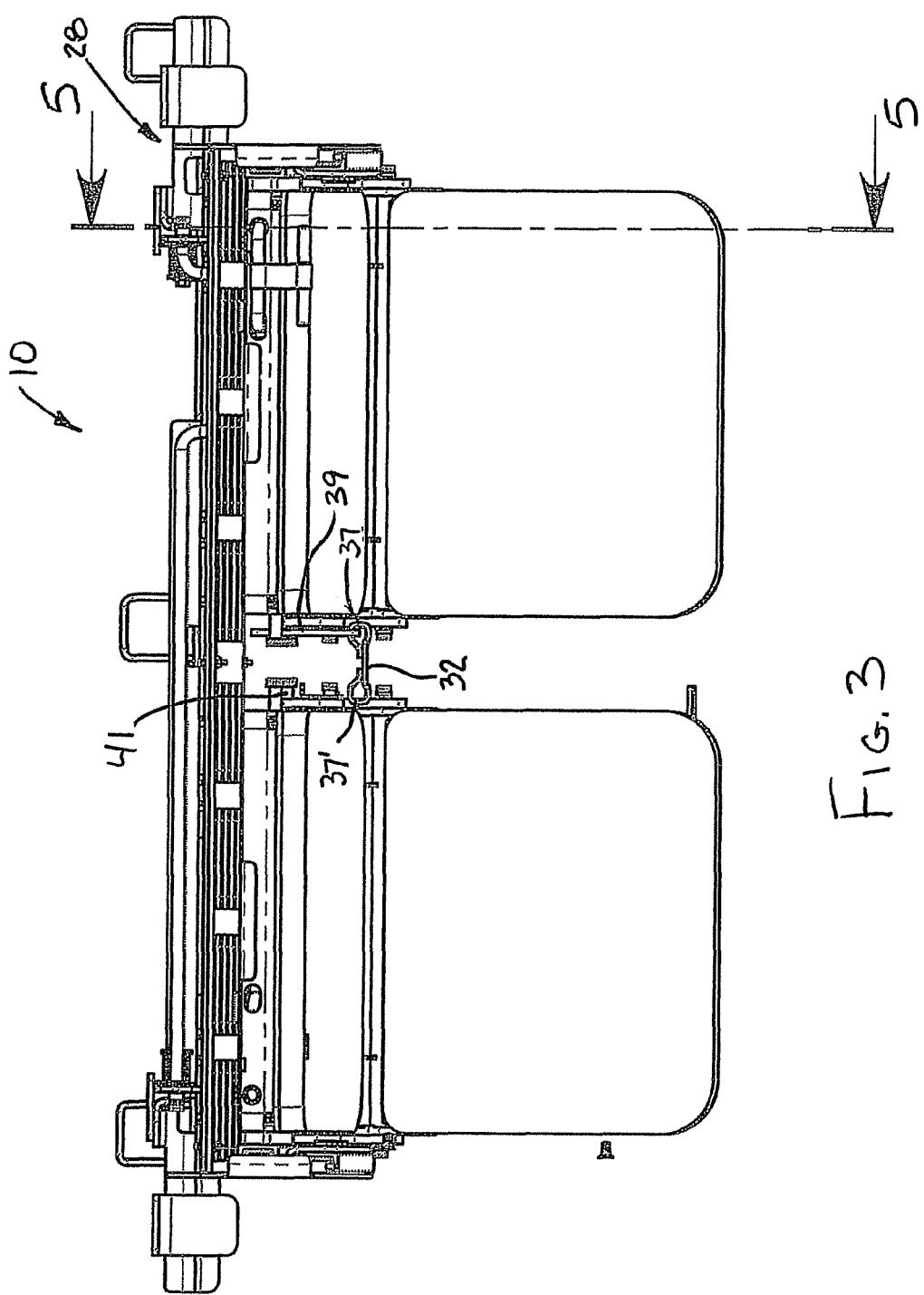
FIG. 3 is a top plan view of the litter system of FIG. 1.

Referring to FIG. 3, each of the bar connection ends 37 of seat release bar 32 can be individually connected to a displaceable rod 39. The one or more displaceable rods 39 are engaged with or released from retention pin 41 upon actuation of seat release bar 32.

Figure 4:
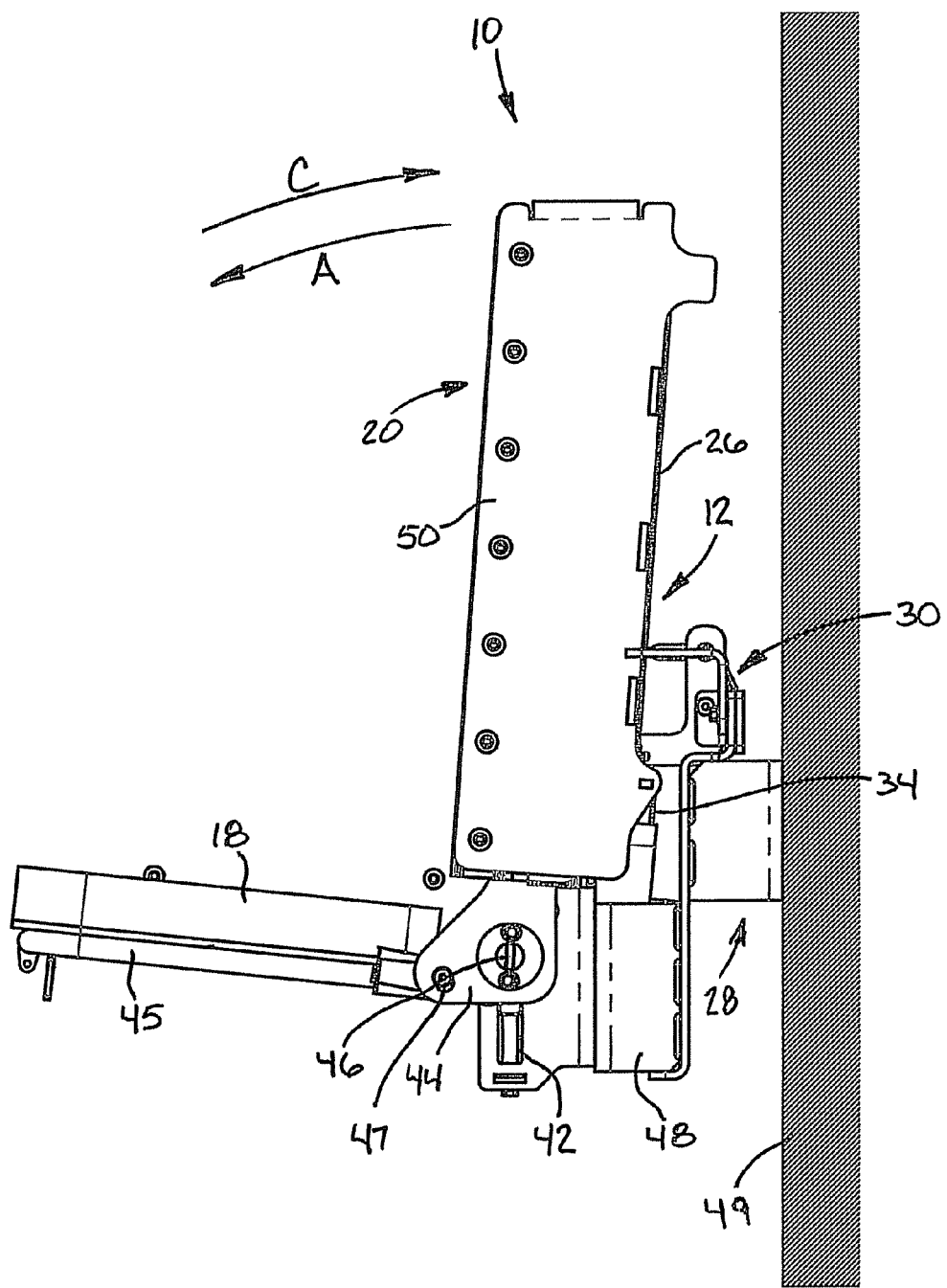
FIG. 4 is a left side elevational view of the litter system of FIG. 1.

Referring to FIG. 4, the following discussion of first seat back member 20 applies equally to second seat back member 24 (not clearly visible in this view). First seat back member 20 is connected to a first outside seat side frame 44. A seat support structure 45, which provides structural support for first seat member 18, is connected to first outside seat side frame 44. A rotational fastener 46 allows for rotation of first seat back member 20 with respect to first outside seat side frame 44 in each of the fold-down direction of rotation "A" and an opposite fold-up direction of rotation "C". A second rotational fastener 47 rotatably connects seat support structure 45 to first outside seat side frame 44 such that first seat member 18 and seat support structure 45 can be rotated away from the extended condition shown to a position substantially parallel with the upright position of first seat back member 20.

A seatbelt retraction mechanism 48 receives and automatically retracts first seatbelt system 34 when not in use. Seatbelt retraction mechanism 48 further provides the capability of tensioning first seatbelt system 34 when in use. A similar seatbelt retraction mechanism 48' (not visible in this view) is provided for second seatbelt system 36. A first litter tray frame 50 defines a first outside frame member of structural frame assembly 12 and is connected to first outside seat side frame 44. First litter tray frame 50 therefore co-rotates during rotation of first seat back member 20. Vehicle connection structure 28 is releasably connected, such as through the use of fasteners (not shown), to a vehicle structure 49 to releasably fix a position of seat mounted extendable litter system 10.

Figure 5:
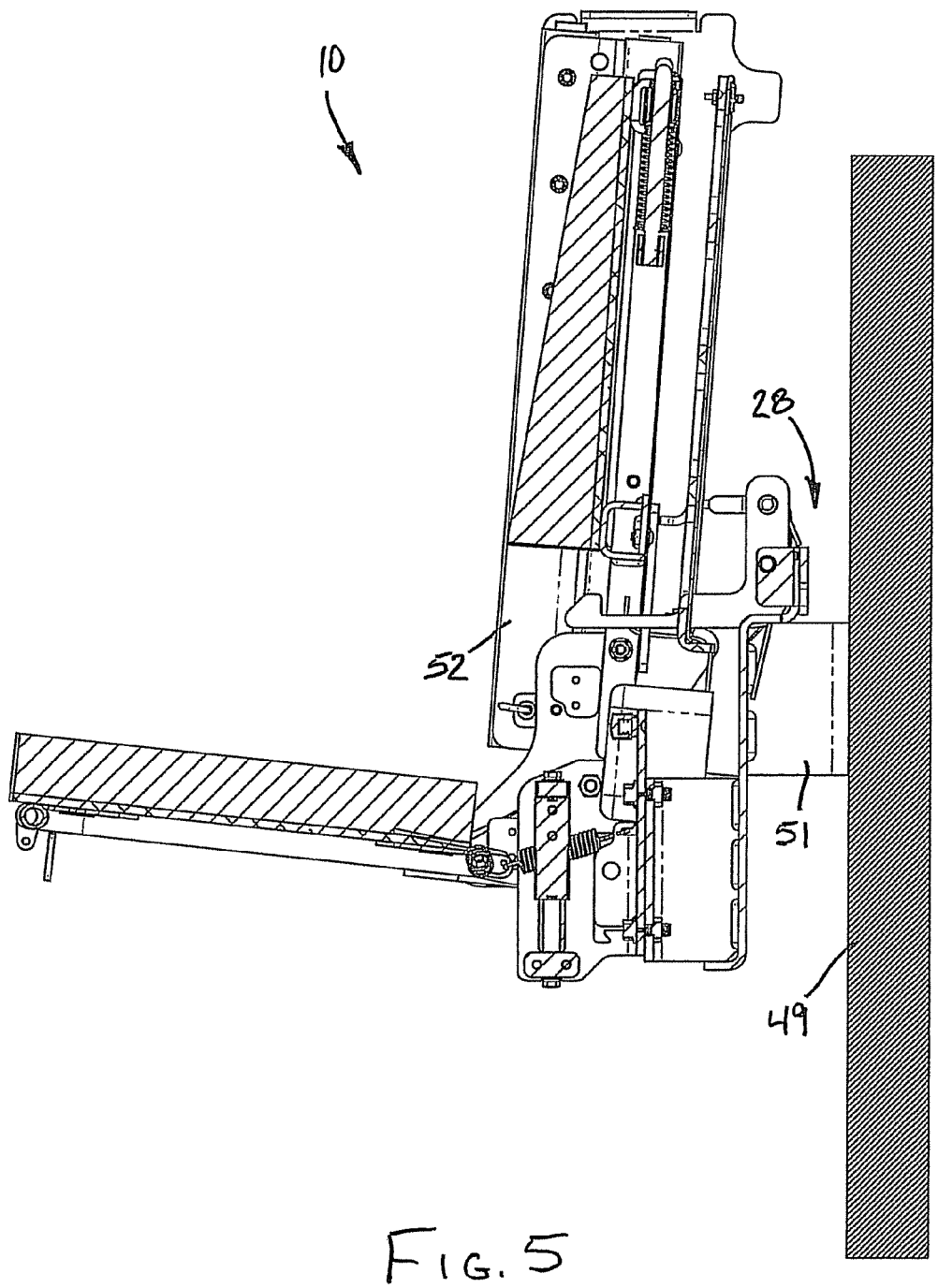
FIG. 5 is a cross sectional left side elevational view taken at section 5 of FIG. 3.

Referring to FIG. 5, at least one bracket 51 of vehicle connection structure 28 is provided to releasably connect seat mounted extendable litter system 10 to vehicle structure 49. A second litter tray frame 52 is visible in this view, which provides a second outside wall for second seat back member 24 of second seat 16.

Figure 6:
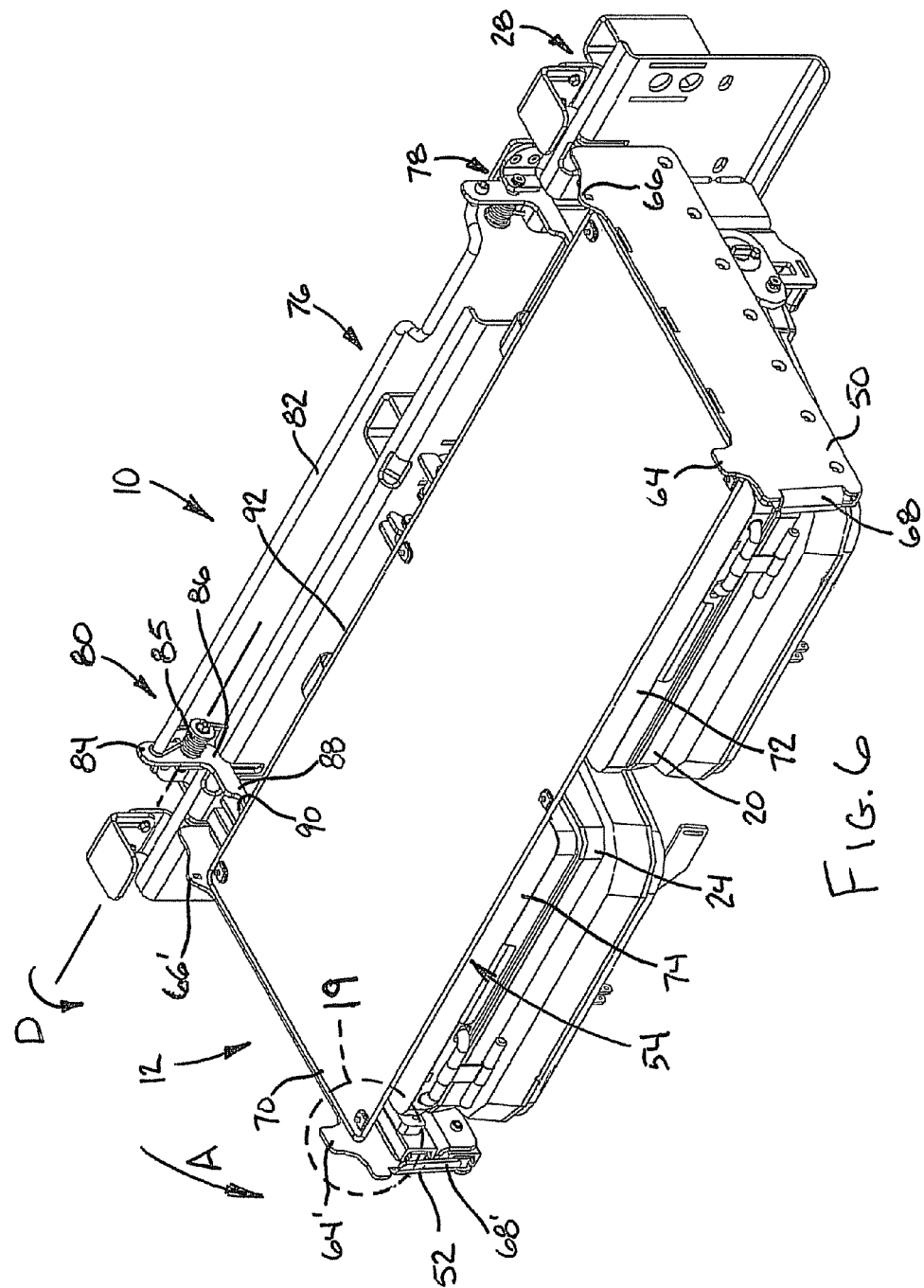
FIG. 6 is a front left perspective view of the litter system of FIG. 1 in a seat folded condition.

Referring to FIG. 6, structural frame assembly 12 is shown following rotation about the fold-down direction of rotation "A" such that a litter tray 54 is exposed. Litter tray 54 is connected to structure of both first and second seat back members 20, 24. Each of the first and second litter tray frames 50, 52 are substantially mirror images of each other and each provides first and second litter retention members 64, 64' and 66, 66', respectively. First and second tray frame handles 68, 68' are integrally provided with each of the first and second litter tray frames 50, 52. A disposable fabric pan 70, connected to litter tray 54, is exposed in the seat folded condition shown. According to several embodiments, disposable fabric pan 70 is releasably retained with respect to litter tray 54 such that disposable fabric pan 70 can be released and replaced as necessary. Disposable fabric pan 70 is in part supported on each of a first and second seat back rear plate 72, 74 individually connected to first and second seat back members 20, 24.

A tray retention release mechanism 76 is provided to initially retain structural frame assembly 12 in the upright condition, previously shown and described, and to release structural frame assembly 12 for rotation in the fold-down direction of rotation "A". Tray retention release mechanism 76 includes first and second mechanism subassemblies 78, 80. Each of the first and second mechanism subassemblies 78, 80 are substantially identical and mirror image configurations of each other. Therefore the following discussion of second mechanism subassembly 80 applies equally to first mechanism subassembly 78. An operating rod 82 is rotatably connected at opposed ends to each of a first arm 84 of an L-shaped lever 86 which is biased to the retention position shown using a biasing member 85, such as a coiled spring. L-shaped lever 86 further includes a second arm 88 having a latch hook 90. Latch hook 90 at its biased position engages a tray frame 92 supporting disposable fabric pan 70. Tray retention/release mechanism 76 is operated by rotating operating rod 82 in a tray mechanism release direction "D" which is defined through a longitudinal axis of the biasing members 85. It is noted that litter tray 54, connected to tray frame 92, are fixedly connected to each of first and second litter tray frames 50, 52 such that both first and second seat back members 20, 24 co-rotate together in the fold-down direction of rotation "A".

Figure 7:
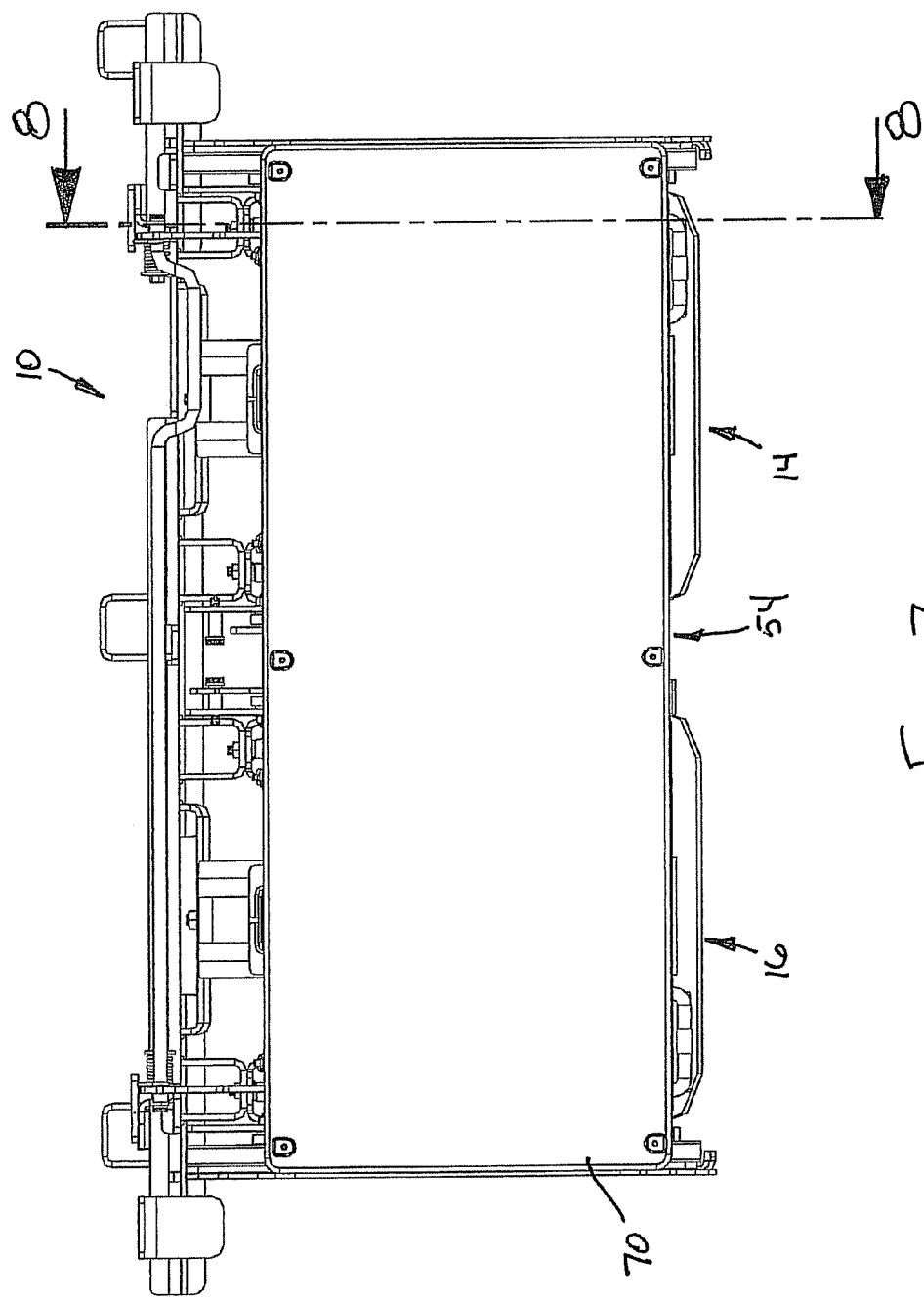
FIG. 7 is a top plan view of the litter system of FIG. 6.

Referring to FIG. 7, in the fold-down condition of disposable fabric pan 70 and litter tray 54, substantially all of both first and second seats 14, 16 are covered by disposable fabric pan 70. This substantially prevents fluids, such as blood or medicine, from escaping past disposable fabric pan 70 and contacting either first or second seat 14, 16. The material of disposable fabric pan 70 is therefore selected to be substantially impermeable to liquids.

Figure 8:
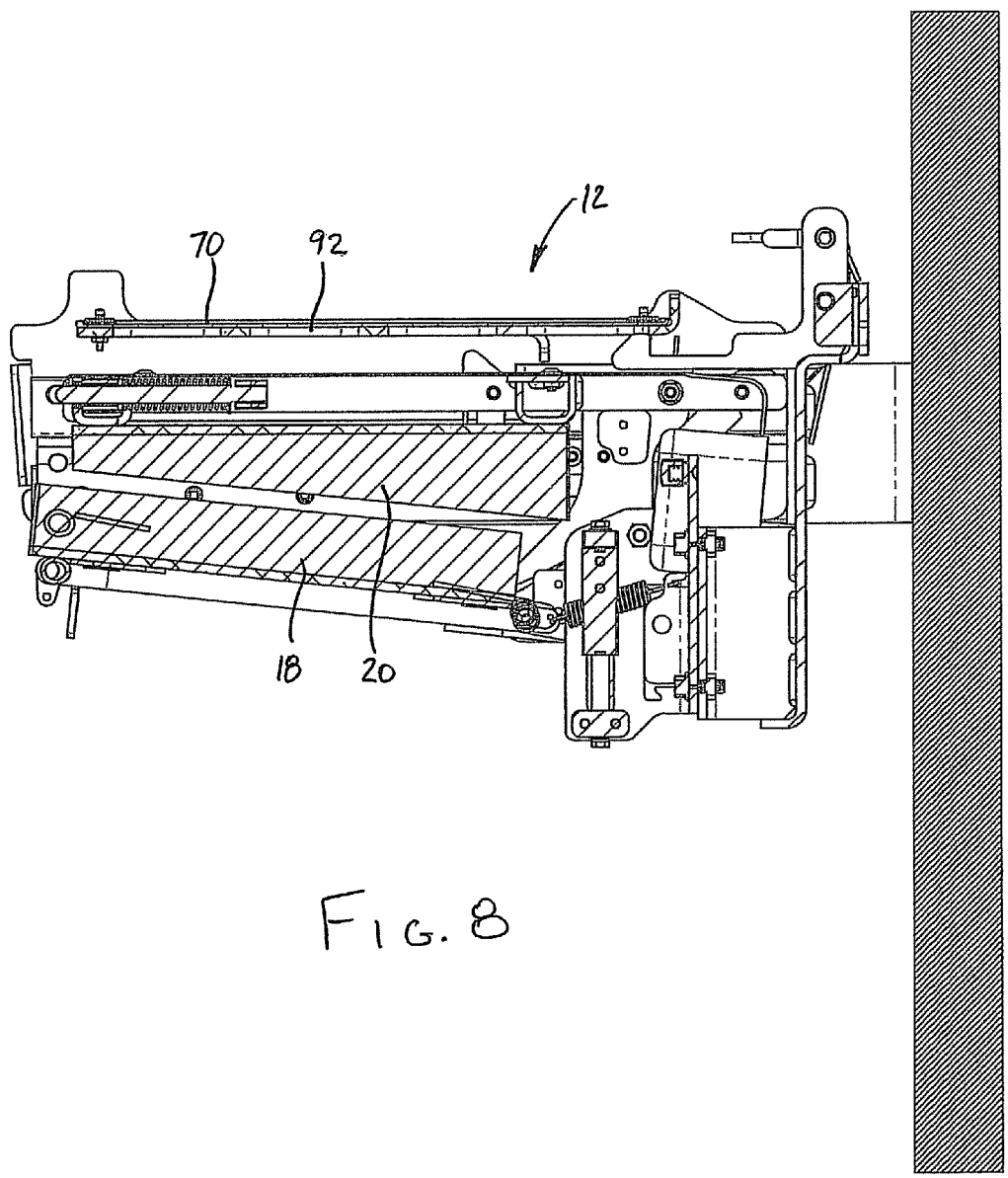
FIG. 8 is a cross sectional left elevational view taken at section 8 of FIG. 7.

Referring to FIG. 8, in the fold-down condition of structural frame assembly 12, the tray frame 92 provides perimeter support for disposable fabric pan 70. Disposable fabric pan 70 covers substantially all of both first seat member 18 and first seat back member 20.

Referring to FIG. 9 and again to FIG. 6, from the fold-down condition of structural frame assembly 12, an operator can actuate tray retention release mechanism 76 by rotation of operating rod 82 in the tray mechanism release rotation direction "D" such that latch hooks 90 of first and second mechanism subassemblies 78, 80 release tray frame 92. The operator can then manually pull on one or both tray frame handles 68, 68' of first and second litter tray frames 50, 52 in a litter tray extending direction "E" to slidably displace litter tray 54 together with disposable fabric pan 70 in the litter tray extending direction "E". This horizontal sliding motion of litter tray 54 is provided by the use of a slide track assembly 55.

Slide track assembly 55 includes a first litter slide 56 connected to first litter tray frame 50, which is slidably disposed with respect to a first litter track 58 connected to structural frame assembly 12. Slide track assembly 55 further provides for sliding motion of second litter tray frame 52 through the use of a second litter slide 60 connected to second litter tray frame 52 which is slidably engaged with a second litter track 62 connected to structural frame assembly 12. First and second litter slides 56, 60 and first and second litter tracks 58, 62 of slide track assembly 55 can be commercially available ball bearing track and slide assemblies selected to support the weight of an occupant supported on litter tray 54 in the litter tray extended condition shown.

Figure 10:
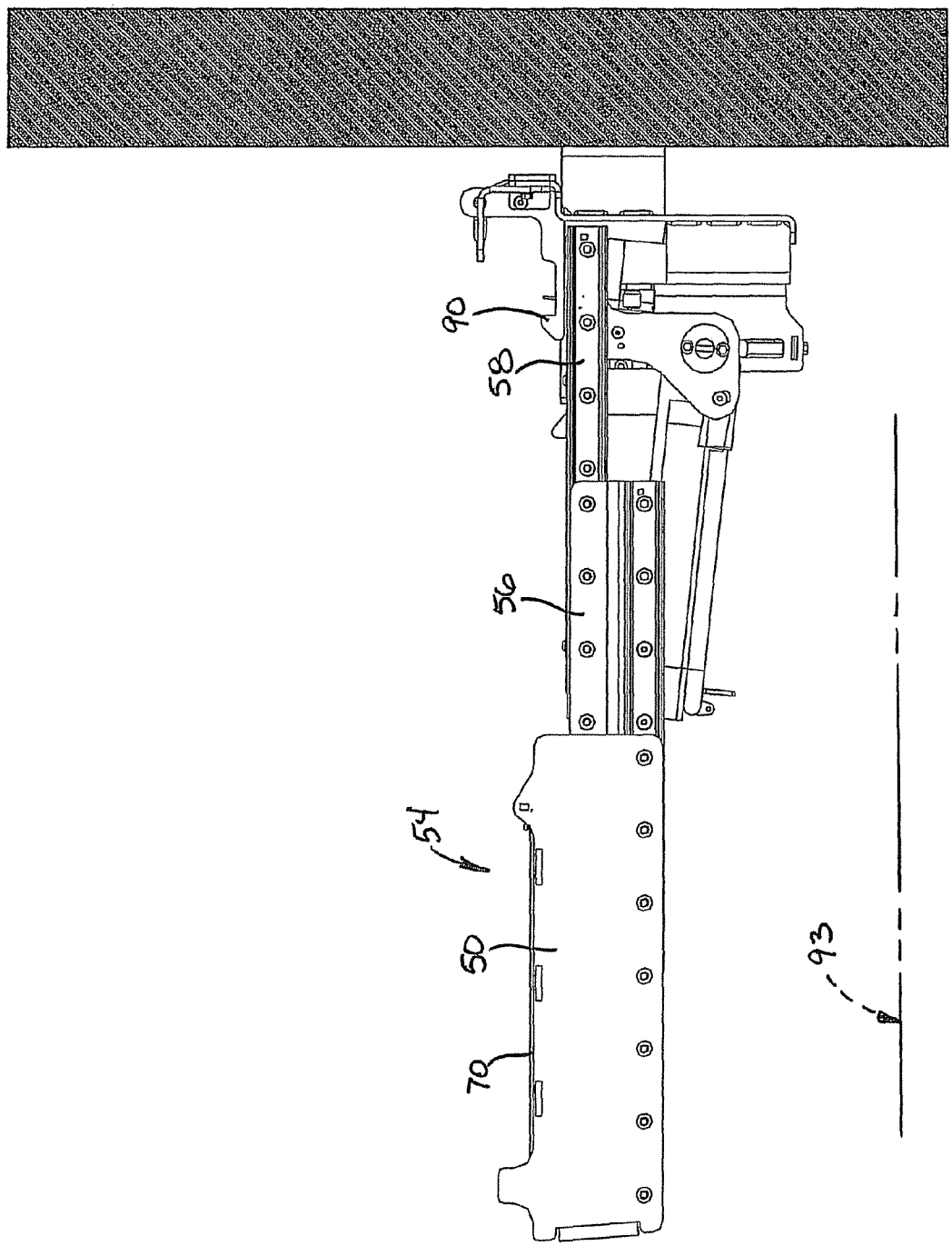
FIG. 10 is a left side elevational view of the litter system of FIG. 9.

Referring to FIG. 10, in the fully extended condition of litter tray 54, the disposable fabric pan 70, first litter slide 56, and first litter track 58 are oriented substantially parallel to a vehicle floor 93. Second litter slide 60 and second litter track 62 (not visible in this view) are similarly oriented substantially parallel to vehicle floor 93. After extension of litter tray 54, the latch hooks 90 are biased to return to their upright position shown for subsequent re-engagement with litter tray 54 when litter tray 54 is returned to the position shown in FIG. 6.

Figure 11:
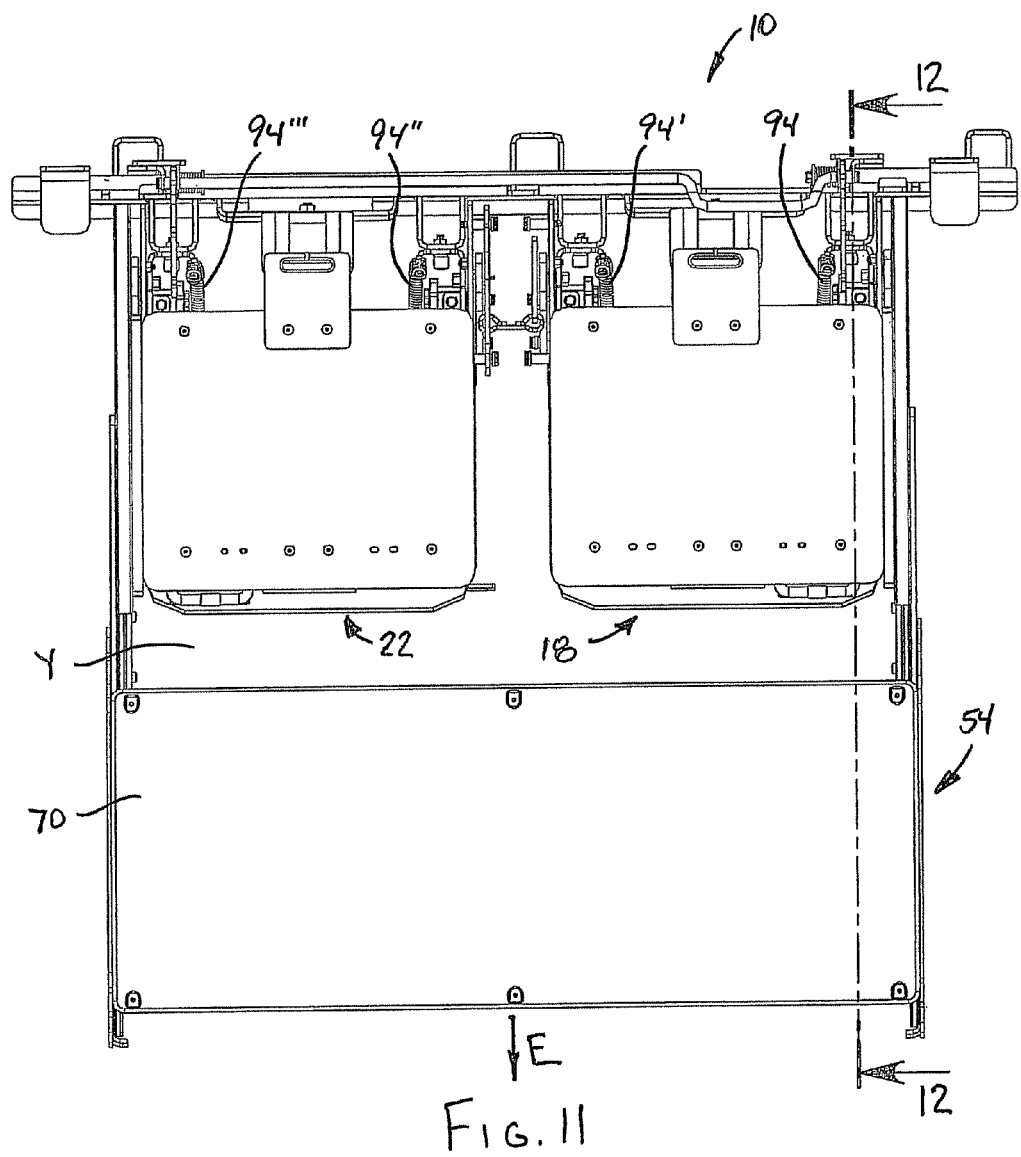
FIG. 11 is a top plan view of the litter system of FIG. 9.

Referring to FIG. 11, following the full extension of litter tray 54 and disposable fabric pan 70 in the litter tray extending direction "E", a space or gap "Y" is created between disposable fabric pan 70 and each of first and second seat members 18, 22. The gap "Y" further prevents liquids such as blood on disposable fabric pan 70 from dropping onto either of the first or second seat members 18, 22. According to several embodiments, a plurality of biasing members 94, 94', 94", 94''' are provided to releasably retain first and second seat members 18, 22 in their downwardly extended condition shown.

Figure 12:
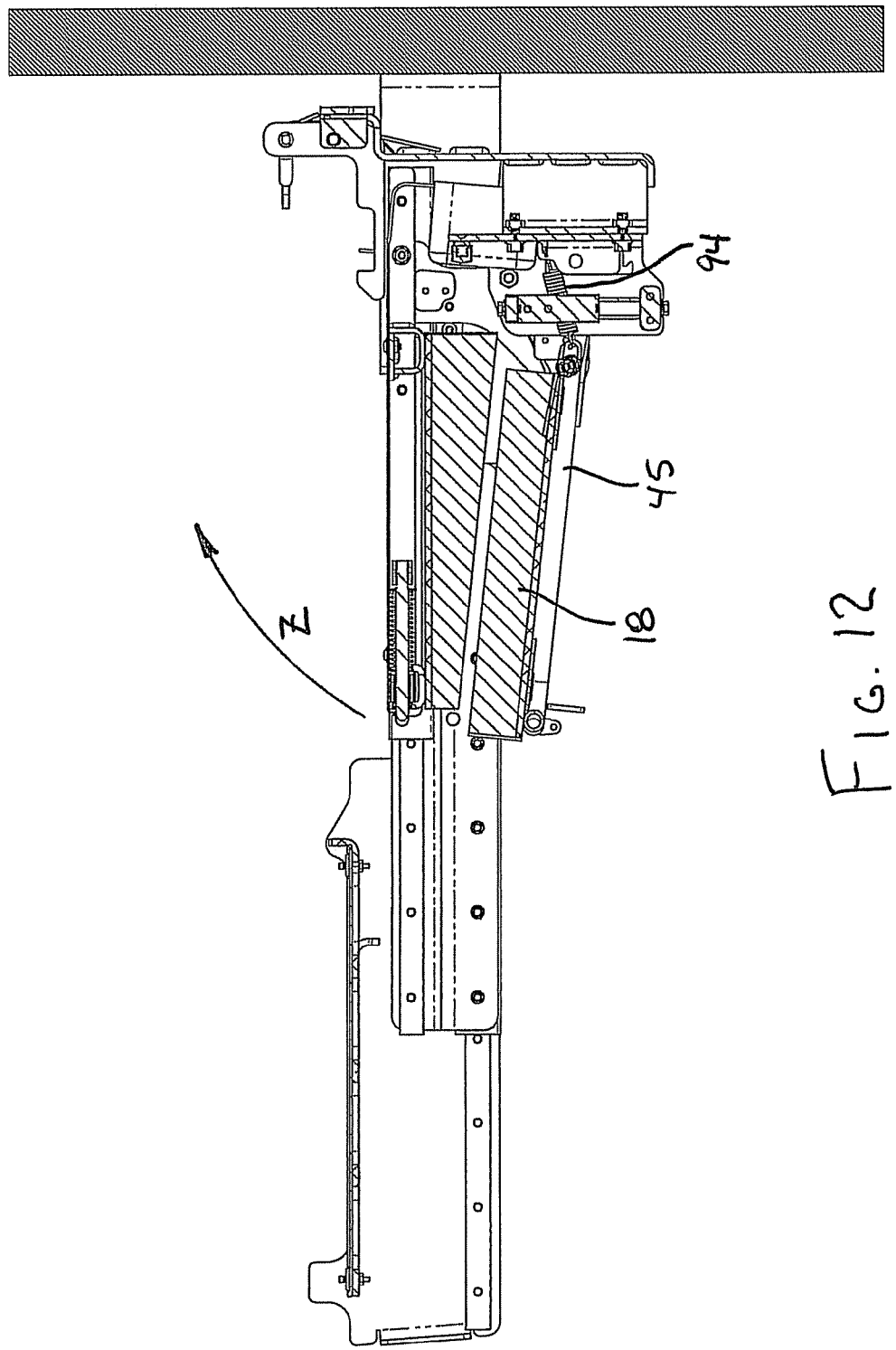
FIG. 12 is a cross sectional left side elevational view taken at section 12 of FIG. 11.

Referring to FIG. 12 and again to FIG. 1, when the first and second seat back members 20, 24 are in their upright positions, the biasing force of the biasing members 94, 94' can be overcome by manually rotating first seat member 18 and seat support structure 45 with respect to an arc of rotation "Z" to align the first seat member 18 with the upright first seat back member 20. The second seat member 22 (not visible in this view) can be similarly rotated by overcoming the biasing force of its biasing members 94", 94'''.

Figure 9:
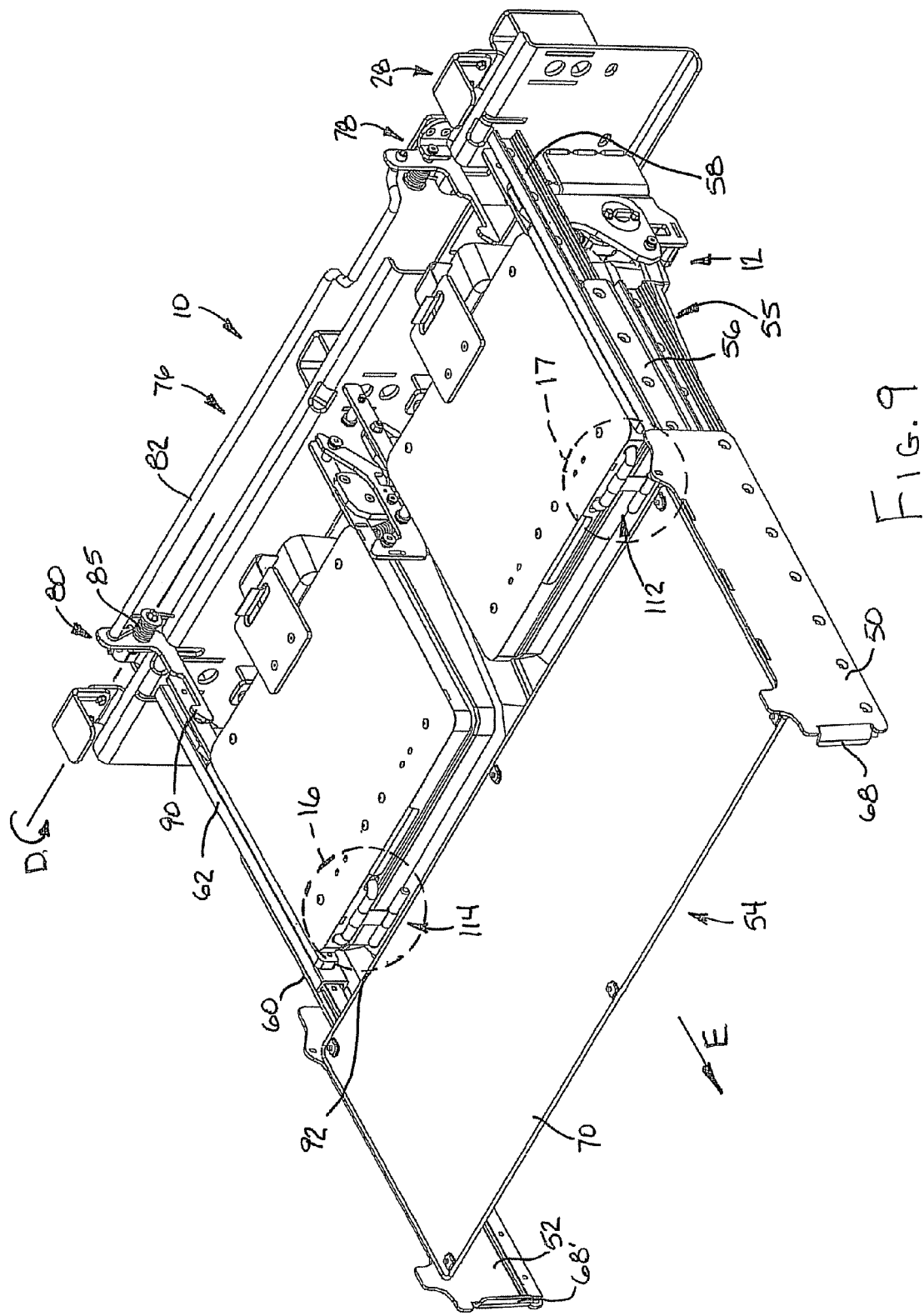
FIG. 9 is a front left perspective view of the litter system of FIG. 1 in a seat folded and litter extended condition.

Referring to FIG. 13 and again to FIGS. 9 and 11, a litter 95 having first and second opposed litter poles 96, 98, with a fabric body 100 connected there-between is shown in a supported condition with respect to litter tray 54. Litter 95 can include a plurality of litter openings, for example a first litter opening 102 and a second litter opening 104 which individually receive one of the first or second litter retention members 64, 66 to help prevent horizontal sliding motion of litter 95 away from the supported condition shown. First and second litter retention members 64, 66 are spaced to be slidably received between and frictionally contact inside walls of first and second litter poles 96, 98.

According to several embodiments, vehicle connection structure 28 further includes first and second fixed brackets 106, 108 positioned at opposed ends of vehicle connection structure 28. First and second fixed brackets 106, 108 are fixed to vehicle connection structure 28 and each define a substantially L-shape such that a bracket cavity 110, 110' is created in their installed condition.

Figure 13:
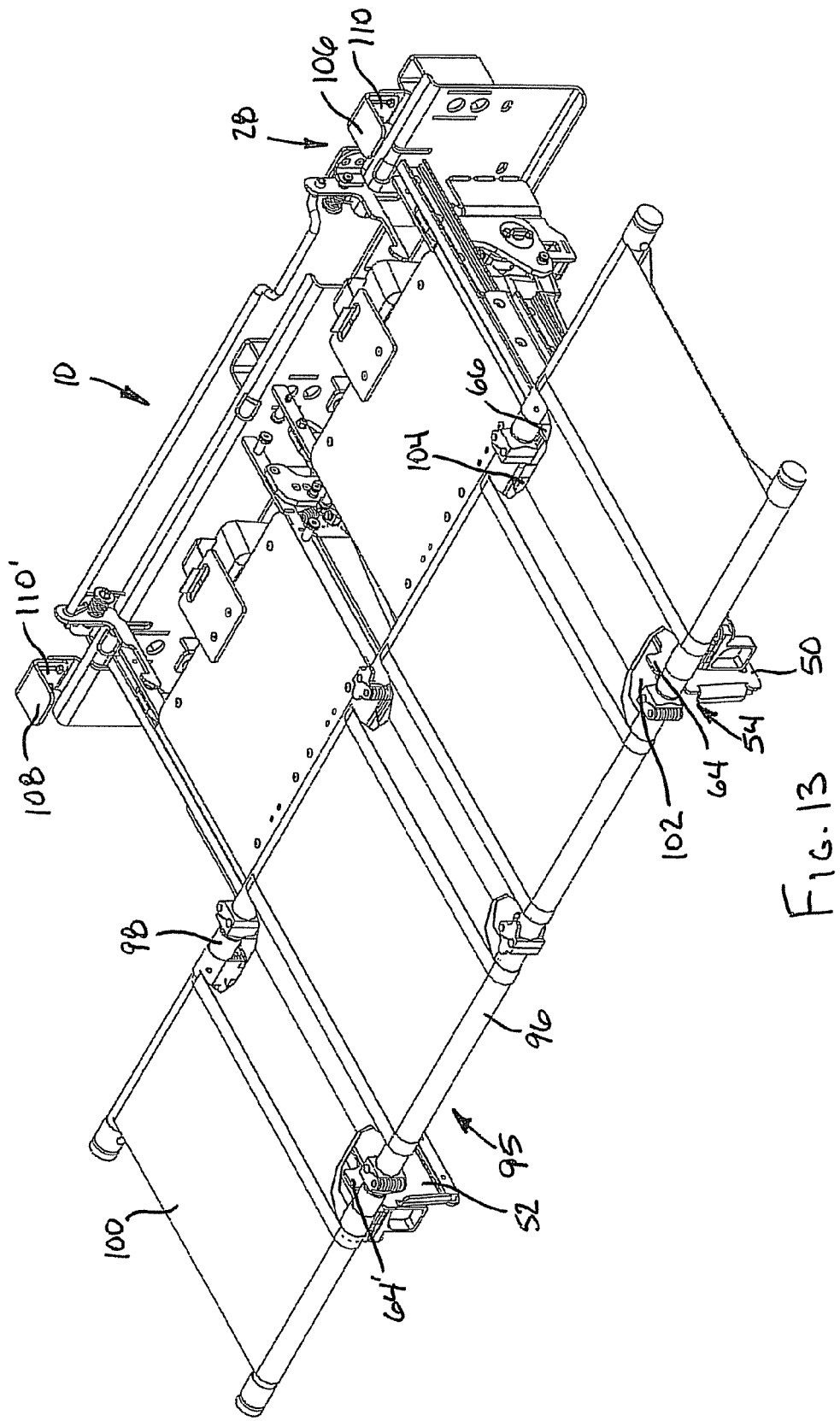
FIG. 13 is a front left perspective view of the litter system of FIG. 9 further showing a litter in a litter support position.
Figure 14:
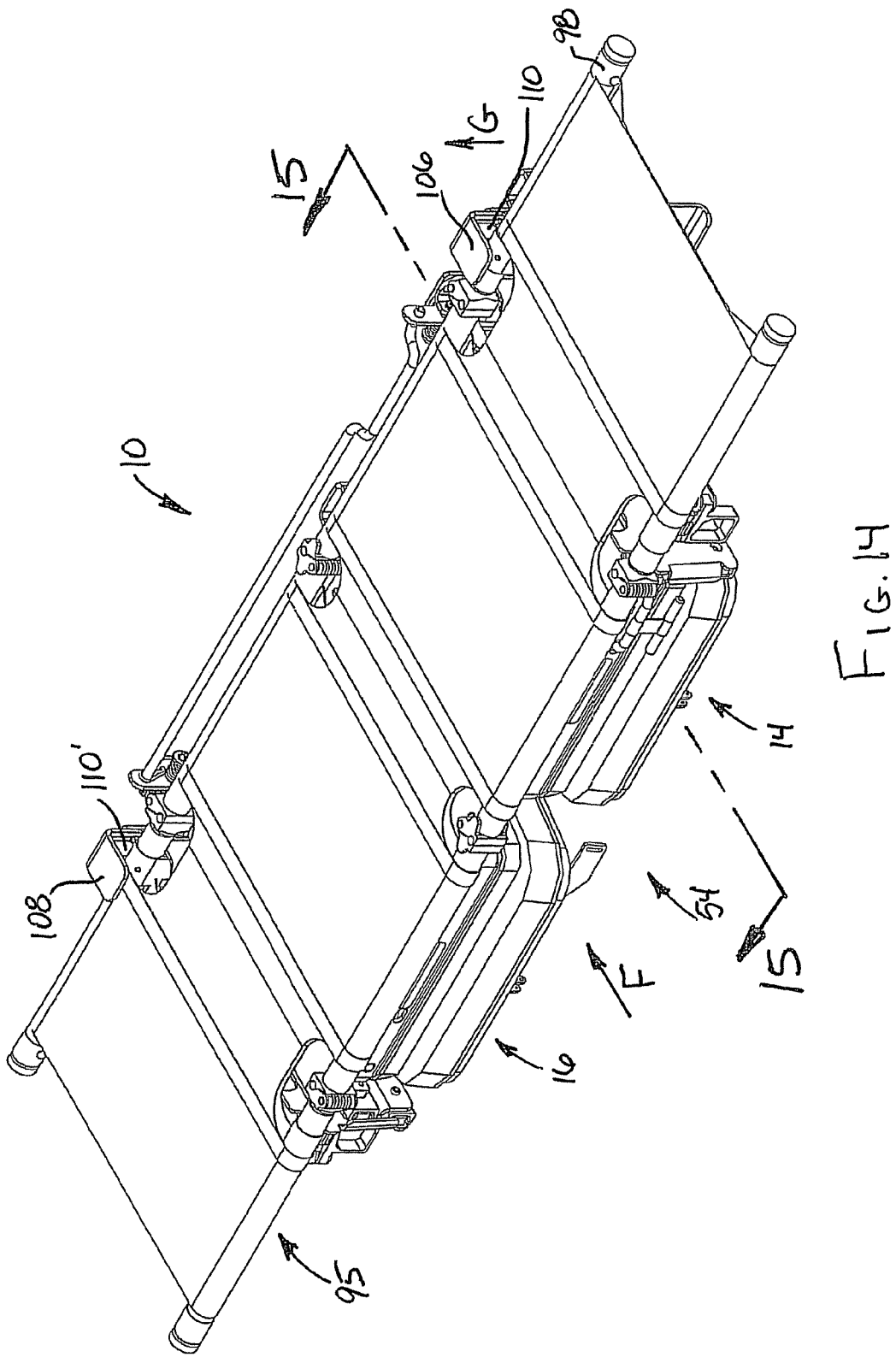
FIG. 14 is a front left perspective view of the litter system of FIG. 13 further showing the litter in a litter stowed position.

Referring to FIG. 14 and again to FIG. 13, litter tray 54 together with litter 95 installed thereon can both be slidably displaced in a litter tray storage direction "F" to position both litter tray 54 and litter 95 in a litter tray stowed condition having litter 95 and litter tray 54 positioned directly above both first and second seats 14, 16 in their folded conditions. In this position, second litter pole 98 is prevented from moving in an upward direction "G" by first and second fixed brackets 106, 108 because second litter pole 98 is positioned within the bracket cavities 110, 110' of both first and second fixed brackets 106, 108.

Figure 15:
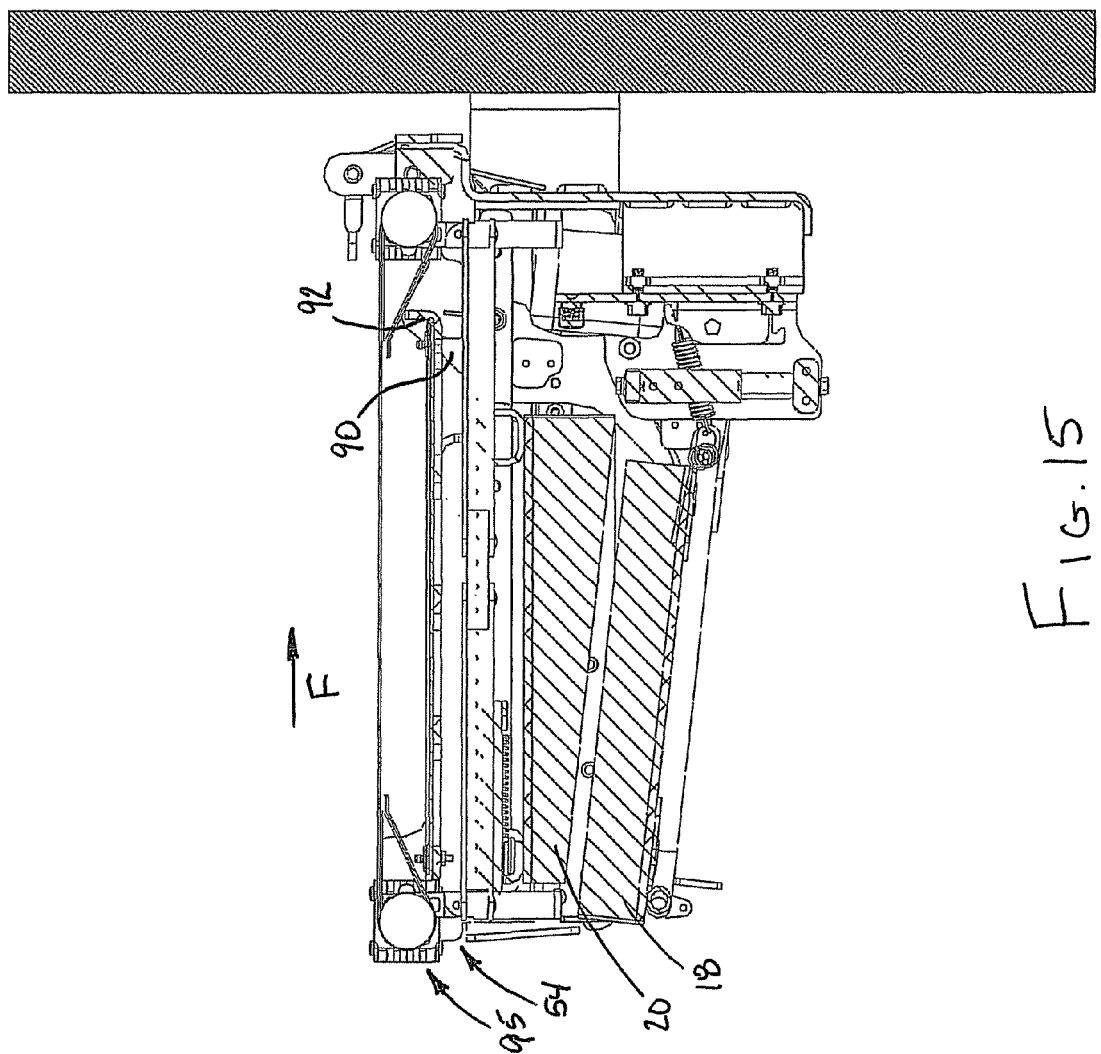
FIG. 15 is a cross sectional left side elevational view taken at section 15 of FIG. 14.

Referring to FIG. 15, in the stowed condition, litter 95 is positioned directly above both first seat member 18 and first seat back member 20, as well as directly above second seat member 22 and second seat back member 24 (not visible in this view). Litter tray 54 and litter 95 are both slidably moved in the litter tray storage direction "F" until latch hooks 90 re-engage tray frame 92 to releasably retain the position shown.

Figure 16:
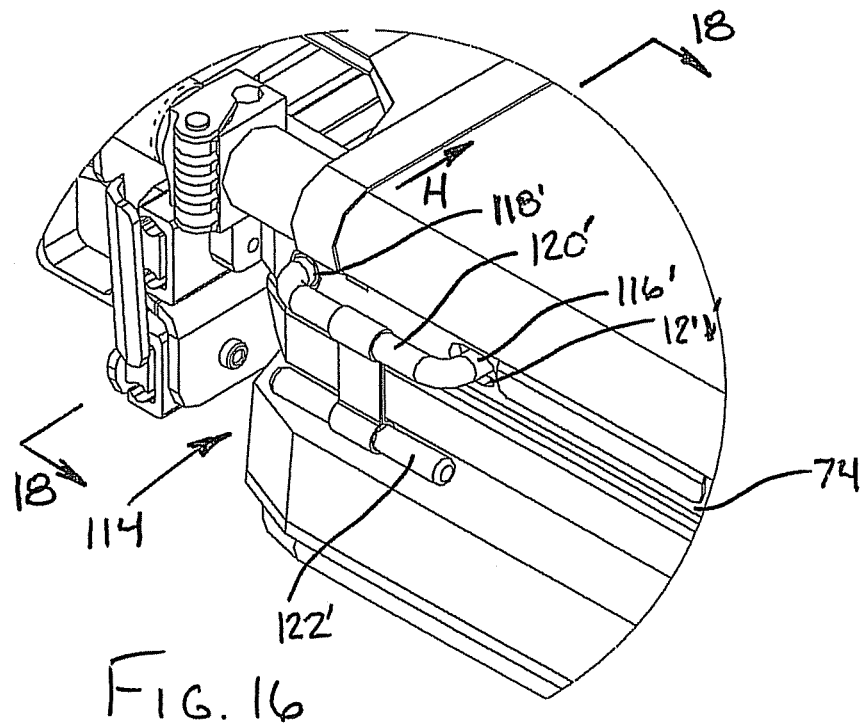
FIG. 16 is a front left perspective view taken at area 16 of FIG. 9.

Referring to both FIGS. 16 and 17 and again to FIG. 9, first and second litter locks 112, 114 are substantially mirror image configurations of each other and, therefore, include substantially the same component parts. In the configuration shown in FIG. 16, second litter lock 114 is shown in its stowed condition having a first litter lock arm 116' which is oriented parallel to a second litter lock arm 118' which are together connected to a center rod 120'. A "T" handle 122' is connected to center rod 120'. In the stowed condition, second litter lock arm 118' is biased in a biasing direction "H" such that first litter lock arm 116' is slidably received in an aperture 124' created in second seat back rear plate 74.

Figure 17:
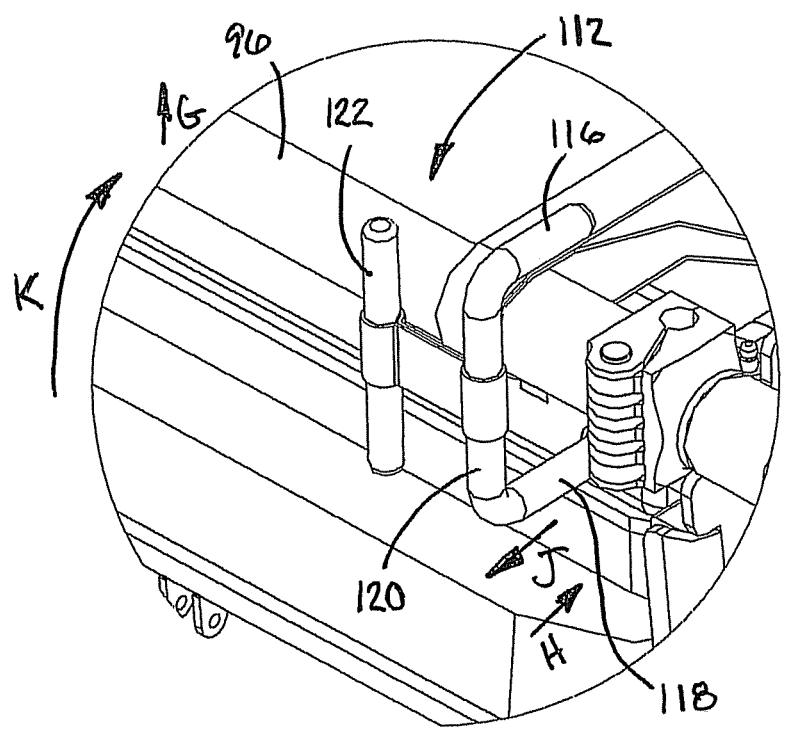
FIG. 17 is a front left perspective view taken at area 17 of FIG. 9.

Referring more specifically to FIG. 17, to actuate the litter locks, such as first litter lock 112, the "T" handle 122 is pulled such that the second litter lock arm 118 is displaced against the biasing force of a biasing member (not shown in this view) in a retraction direction "J" freeing the first litter lock arm 116 from the cavity 124 (not visible in this view). Center rod 120 is thereafter rotated in a direction of rotation "K" (clockwise for first litter lock 112) until first litter lock arm 116 is positioned above first litter pole 96 to prevent first litter pole 96 from being displaced in the upward direction "G". First litter lock 112 and/or second litter lock 114 can be returned to their stowed positions by reversing this operation and allowing the second litter lock arm 118 to be retracted in the biasing direction "H".

Figure 18:
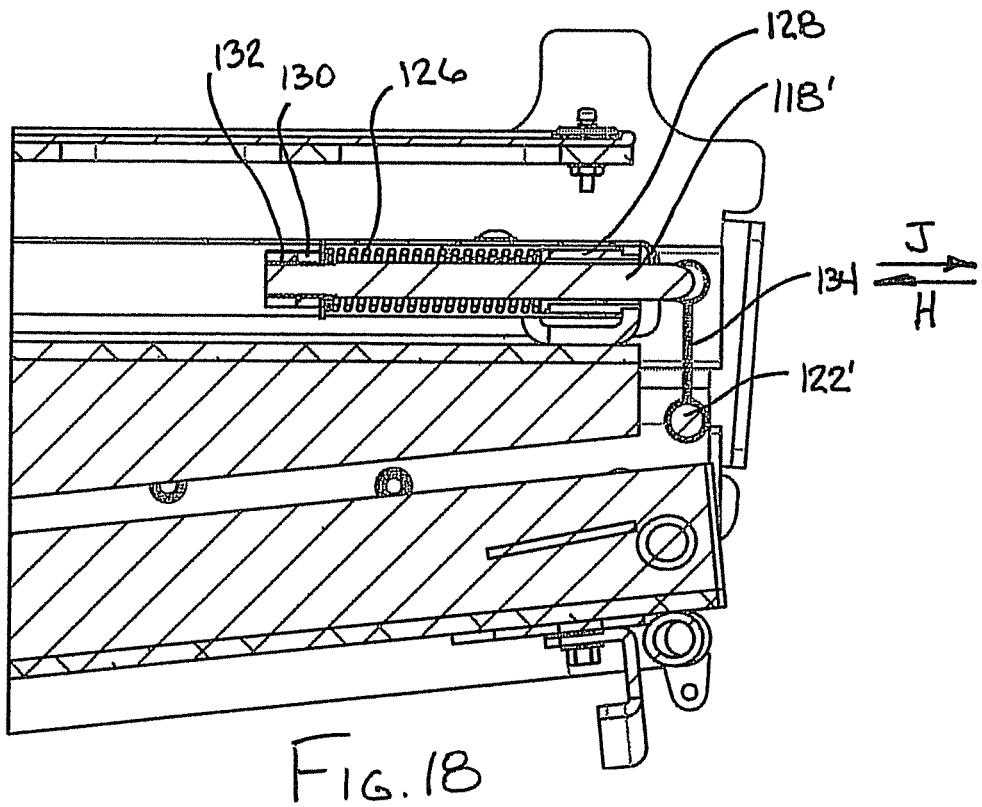
FIG. 18 is a cross sectional side elevational view taken at section 18 of FIG. 16.

Referring to FIG. 18, the exemplary stowed condition of second litter lock 114 is provided having second litter lock arm 118' slidably disposed within the retention aperture by a biasing force of a biasing member 126 such as a compression spring. Biasing member 126 is retained between a biasing member stop 128 and a biasing member retainer 130. A plurality of lock arm threads 132 of second litter lock arm 118' are threadably engaged with lock arm threads 132. When second litter lock arm 118' is displaced in the retraction direction "J" biasing member 126 compresses. When the first litter lock arm 116' (not visible in this view) is moved to its desired position, the biasing force of biasing member 126 moves both first and second litter lock arms 116', 118' in the biasing direction "H". A strap 134 can be used to connect T-handle 122' to center rod 120' (not visible in this view). Strap 134 is rotated downward to a stowed position and can be rotated to effect displacement of second litter lock arm 118' in the retraction direction "J".

Figure 19:
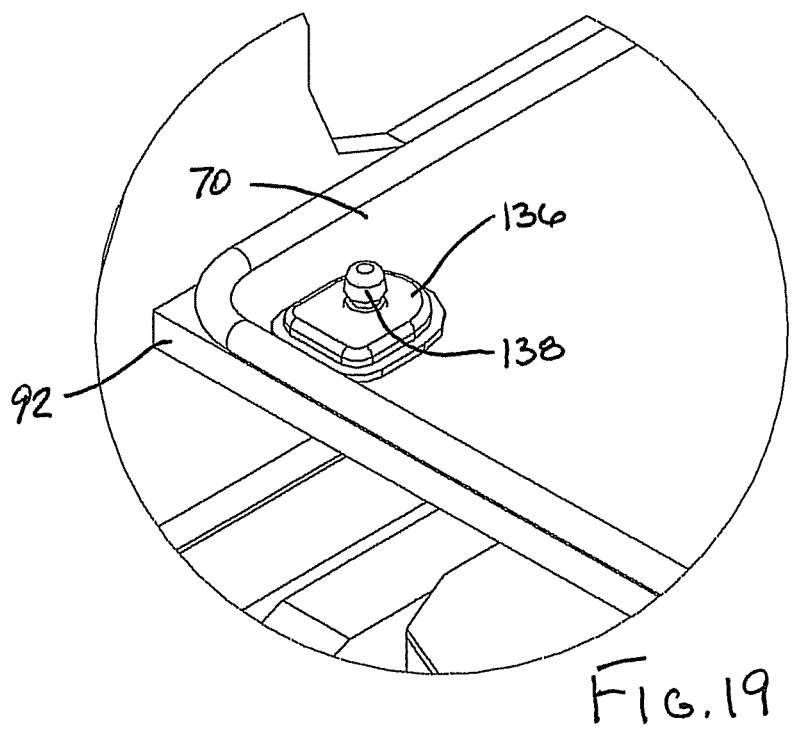
FIG. 19 is a front left perspective view taken at area 19 of FIG. 6.

Referring to FIG. 19, disposable fabric pan 70 is releasably connected to tray frame 92 using a plurality of releasable fasteners 136. Each releasable fastener 136 is downwardly frictionally engaged onto one of a plurality of posts 138 (as viewed in FIG. 19), which are individually fixed to tray frame 92. The connection of disposable fabric pan 70 is therefore substantially a snap fit to promote rapid release and replacement of disposable fabric pan 70. Other snap, compression, rotating, pinned, clipped or the like fastener assemblies can be substituted for the connection provided by releasable fasteners 136 and posts 138.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat mounted extendable litter system, comprising:
    a structural frame assembly supporting a seat, the seat having a seat member, and a seat back member rotatable with respect to the seat member to provide each of a seat upright condition and a seat folded condition; and
    a litter tray slidably connected to the structural frame assembly and oriented substantially horizontal in the seat folded condition such that the litter tray is slidable between a litter tray stowed condition positioned above the seat back member and a litter tray extended condition.

2. The seat mounted extendable litter system of claim 1, wherein the litter tray includes:
    a tray frame connected to and supporting the litter tray and connected to the structural frame assembly; and
    at least one retention member releasably retaining a litter on the litter tray when in the seat folded condition such that the litter and the litter tray are together slidable between the litter tray extended condition and the litter tray stowed condition, and between the litter tray stowed condition and the litter tray extended condition.

3. The seat mounted extendable litter system of claim 2, wherein the at least one retention member includes at least one latch hook operating to release the tray frame from the litter tray stowed condition.

4. The seat mounted extendable litter system of claim 1, wherein the litter tray further includes a slide track assembly, having:
    first and second litter tracks each connected to the structural frame assembly;
    a first litter slide connected to the first litter track having a first litter tray frame slidably disposed with respect to the first litter slide; and
    a second litter slide connected to the second litter track having a second litter tray frame slidably disposed with respect to the second litter slide.

5. The seat mounted extendable litter system of claim 4, further including a disposable fabric pan releasably connected to the first and second litter tray fames and positioned beneath a litter supported on the litter tray.

6. The seat mounted extendable litter system of claim 1, further including:
a tray frame supporting the litter tray and connected to the structural frame assembly; and
a tray retention release mechanism including:
first and second mechanism subassemblies individually having one of a first or a second latch hook; and
an operating rod connecting the first and second mechanism subassemblies, the operating rod when rotated in a tray mechanism release rotation direction rotating the first and second latch hooks to release the litter tray from the litter tray stowed condition to slide with respect to the structural frame assembly, the litter tray subsequently manually displaceable in a litter tray extending direction.

7. The seat mounted extendable litter system of claim 1, further including:
first and second litter tray frames connected to the structural frame; and
a slide track assembly connected to both of the first and second litter tray frames having the litter tray connected to the slide track assembly.

8. The seat mounted extendable litter system of claim 1, further including:
a tray frame connected to and supporting the litter tray; and
a tray retention release mechanism connected to the structural frame member having a latch hook releasably engaged with the tray frame to maintain the litter tray in the litter tray stowed condition.

9. The seat mounted extendable litter system of claim 1, wherein the litter tray in the litter tray stowed condition is positioned above the seat back member thereby overlapping the seat back member and the seat member, and the litter tray in the litter tray extended condition is positioned away from both the seat back member and the seat member.

10. A seat mounted extendable litter system, comprising:
a structural frame assembly supporting first and second seats, the first and second seats each having a seat member, and a seat back member rotatable with respect to the seat member defining a seat upright condition and a seat folded condition having the seat back member positioned against the seat member;
a litter tray slidably connected to the structural frame assembly and oriented substantially horizontal in the seat folded condition such that the litter tray is slidable between a litter tray stowed condition and a litter tray extended condition; and
a seat release mechanism including a seat release bar actuated to release the structural frame assembly from the upright condition for rotation in a fold-down direction of rotation to the seat folded condition.

11. The seat mounted extendable litter system of claim 10, wherein the seat release bar is positioned between first and second seat side frames each connected to one of first and second seats, the seat release bar including opposed bar connection ends displaceable in a mechanism release direction.

12. The seat mounted extendable litter system of claim 11, wherein the seat release bar in the mechanism release direction is downwardly actuated and rotated thereby moving the bar connection ends to disengage a seat back common support member from a retention pin, permitting the first and second seat back members to rotate downwardly away from the upright condition.

13. The seat mounted extendable litter system of claim 12, wherein each of the bar connection ends of the seat release bar are individually connected to a displaceable rod, the displaceable rod engaged with or released from the retention pin upon actuation of seat release bar.

14. The seat mounted extendable litter system of claim 10, further including a vehicle connection structure to which the structural frame assembly is connected and a plurality of energy absorbers connecting the structural frame assembly to the vehicle connection structure, the energy absorbers acting to limit a load imparted to occupants of either the first or second seats.

15. The seat mounted extendable litter system of claim 10, further including first and second seatbelt systems individually connected to one of the first or second seats, the first and second seatbelt systems acting to individually restrict an occupant of one of the first or second seats in the seat upright condition.

16. A seat mounted extendable litter system, comprising:
a structural frame assembly supporting first and second seats, the first and second seats each having a seat member and a seat back member rotatable with respect to the seat member defining a seat upright condition and a seat folded condition having the seat back member positioned against the seat member;
a litter tray slidably connected to the structural frame assembly and oriented substantially horizontal in the seat folded condition such that the litter tray is slidable between a litter tray stowed condition and a litter tray extended condition;
a disposable, fabric pan releasably connected to first and second litter tray fames connected to the litter tray and the structural frame, the disposable fabric pan positioned beneath a litter when the litter is temporarily supported on the litter tray.

17. The seat mounted extendable litter system of claim 16, wherein the litter includes:
first and second opposed litter poles with a fabric body connected there-between in a supported condition with respect to the litter tray; and
a first litter opening and a second litter opening individually receiving one of a first or second litter retention member to mitigate against horizontal sliding motion of the litter away from the litter stowed condition, the first and second litter retention members being spaced to be slidably received between and frictionally in contact with an inside wall of each of first and second litter poles.

18. The seat mounted extendable litter system of claim 17, wherein the litter tray having the litter installed thereon are both slidably displaced in a litter tray storage direction to position both the litter tray and the litter in the litter tray stowed condition having the litter and the litter tray positioned directly above both the first and second seats in the seat folded condition, the second litter pole being prevented from moving in an upward direction in the seat folded condition by first and second fixed brackets having the second litter pole positioned within a bracket cavity of both the first and second fixed brackets.

19. The seat mounted extendable litter system of claim 16, wherein following a full extension of the litter tray and the disposable fabric pan in a litter tray extending direction, a gap is created between the disposable fabric pan and each of the first and second seats, the gap acting to prevent a liquid on the disposable fabric pan from dropping onto either of the first or the second seats.

20. The seat mounted extendable litter system of claim 16, further including a plurality of biasing members releasably retaining the first and second seats in the seat folded condition, a biasing force of the biasing members being overcome by a manual rotation of the first and second seats and a seat support structure with respect to an arc of rotation to thereby align the first seat with the upright first seat back member and the second seat with the upright second seat back member.

21. The seat mounted extendable litter system of claim 16, further including:
   a tray frame supporting the structural frame assembly operating to slidably support the litter tray; and
   at least one latch hook operating to release the tray frame from the litter tray stowed condition, the latch hooks after extension of the litter tray to the litter tray extended condition are biased to return to an upright position for subsequent re-engagement with the litter tray when the litter tray is returned to the litter tray stowed condition.

22. The seat mounted extendable litter system of claim 16, further including:
   first and second litter locks in a stowed condition each having a first litter lock arm oriented parallel to a second litter lock arm, the first and second litter lock arms both connected to a center rod; and
   a "T" handle connected to the center rod, the second litter lock arm in the stowed condition being biased in a biasing direction such that the first litter lock arm is slidably received in an aperture created in a seat back rear plate.

* * * * *